May 3, 1966
J. N. PEARSE ETAL
3,249,771
STABILIZED TIMING CICUIT
Filed Sept. 16, 1964
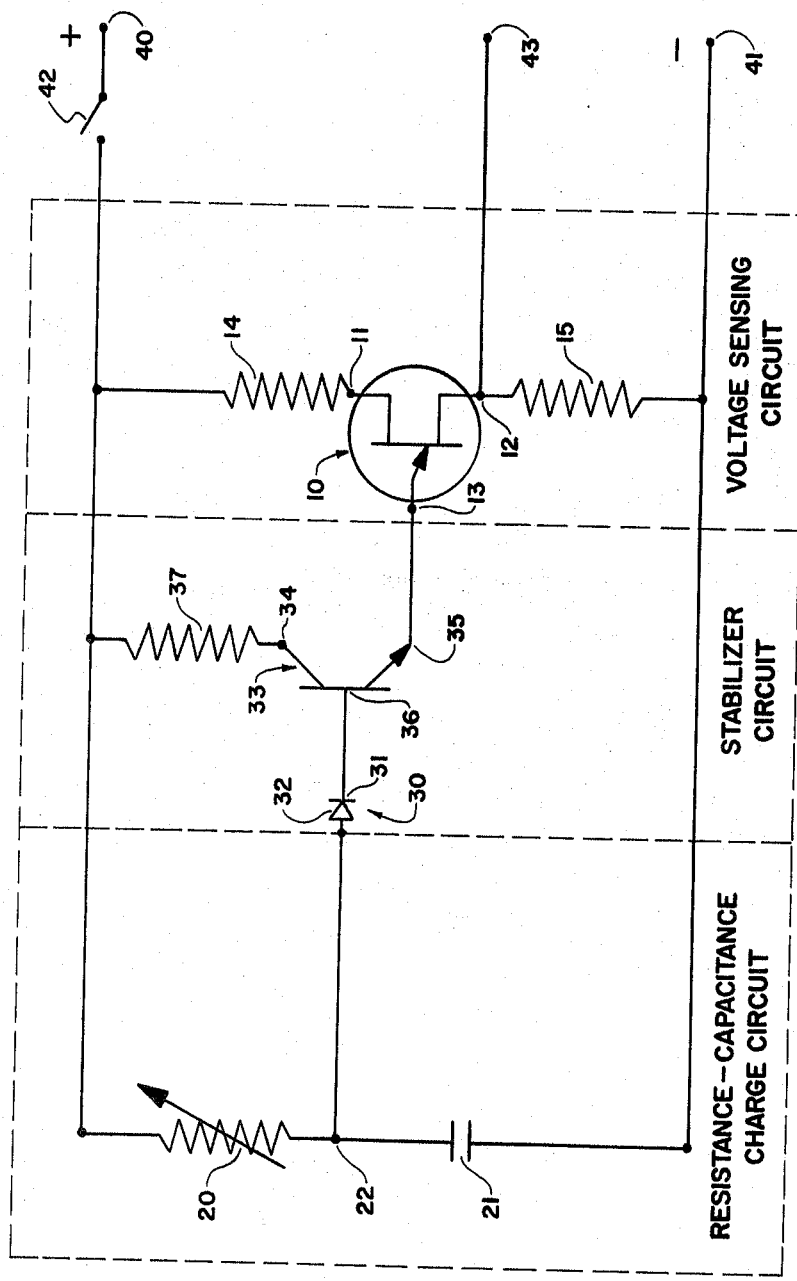
INVENTORS
JAMES N. PEARSE
JAMES D. STEWARDSON
BY
*Arnold J. Ericsen*

3,249,771
STABILIZED TIMING CIRCUIT
James N. Pearse, Menomonee Falls, Wis., and James D. Stewardson, Englewood, Colo., assignors to Allen-Bradley Company, Milwaukee, Wis., a corporation of Wisconsin
Filed Sept. 16, 1964, Ser. No. 396,899
2 Claims. (Cl. 307—88.5)

This invention relates to a timing circuit and more specifically to improvements in timing circuits utilizing voltage sensing means in conjunction with a controlled potential source means, wherein the sensing means senses the magnitude of the potential across the source and conducts accordingly to provide an output signal. The present invention is characterized by a stabilizing circuit connected in series with the controlled source means and the voltage sensing means. The stabilizing circuit includes circuitry arranged to provide a high input impedance to the sensing means and to minimize the current leakage of the source means.

Timing circuits in general have many industrial and laboratory applications where it is desirable to have an accurate preset time delay or interval between mechanical or electrical operations. A few of these applications may include machine tool controls, flow control and filling operations, and timing controls for environmental test chambers and ovens.

Many timing circuits of the prior art include voltage sensing means having input voltage to input current characteristics (resistance) which are positive until the input voltage reaches a certain magnitude, commonly referred to as the breakover voltage, and then once the breakover voltage is obtained the input current increases with a decreasing input voltage over a range of the curve such that the voltage to current characteristics are negative (commonly referred to as the negative resistance area). Examples of devices having such characteristics include unijunction transistors, four layer diodes, controlled rectifiers used as two terminal devices and neon (or other gas filled) bulbs. The timing circuit may also include a controlled potential source which provides input voltage and input current to the voltage sensing means. The controlled potential source is frequently in the form of a capacitance-resistance charge or discharge circuit which is excited by an external source. Once the input voltage to the senser reaches the breakover point the controlled source provides a pulse of energy through the sensing means. After the pulse of energy has been delivered the cycle is repeated. The time delay in receiving the pulse of energy may be controlled such that a load device dependent on the pulse of energy may in turn be controlled according to the repetition rate of the pulse of energy.

The timing circuit of the present invention incorporates the above principle and also includes a stabilizing circuit incorporated in series between the controlled source and the sensing means which in combination provides a stabilized timing circuit capable of providing long time delays.

Accordingly, it is the primary object of the present invention to provide a versatile, economical and sturdy timing circuit that may be utilized for prolonged time delays.

A further object of the present invention is to provide a time delay circuit which is reliable and stable in the presence of large fluctuations in ambient temperatures.

Another object of the present invention is to provide a durable timing circuit that is stable and reliable over a long life span.

The foregoing and other objects will appear in the description to follow. In the description, reference is made to the accompanying drawing which forms a part hereof in which there is shown by way of illustration a specific embodiment in which this invention may be practiced. This embodiment will be described in sufficient detail to enable those skilled in the art to practice this invention, but it is to be understood that other embodiments of the invention may be used and that changes may be made in the embodiment without deviation from the scope of the invention. Consequently, the following detailed description is not to be taken in a limiting sense; instead, the scope of the present invention is best defined by the appended claims.

The single figure of the drawing diagrammatically represents a timing circuit in accordance with the invention. For purposes of explanation the timing circuit is divided into three main sections: a voltage sensing circuit; a controlled potential source in the form of a resistance-capacitance charge circuit; and a stabilizer circuit. The voltage sensing circuit includes a unijunction transistor 10. The unijunction transistor 10 includes a base-two terminal 11, a base-one terminal 12 and an emitter terminal 13. The voltage sensing circuit also includes a resistor 14 which is connected to the base-two terminal 11 and a resistor 15 connected to the base-one terminal 12.

The resistance-capacitance charge circuit includes a variable resistance 20 connected in common with the resistor 14 of the voltage sensing circuit. The charge circuit further includes a capacitor 21 connected in common with the resistor 20 at a terminal 22 and with the resistor 15 of the voltage sensing circuit.

The stabilizer circuit consists of a unidirectional conducting device 30, in this case a diode with a cathode 31 and an anode 32. The cathode 31 is connected to a current gate control 33, in this case a transistor with a collector 34, an emitter 35 and a base 36. The base 36 is connected to the cathode 31 of the diode 30 and the emitter 35 of the transistor 33 is connected to the emitter 13 of the unijunction transistor 10. The collector 34 of the transistor 33 is connected to a bias resistor 37 which is also connected in common with the resistor 20 of the resistance-capacitance charge circuit and the resistor 14 of the voltage sensing circuit. Completing the circuitry of the stabilizer and the timer, the anode 32 of the diode 30 is connected in common with the variable resistor 20 and the capacitor 21 at the terminal 22.

The above-described circuitry is supplied by an operating D.C. potential source. The D.C. potential is not shown in the circuitry of the drawing, but it will customarily be supplied across a pair of terminals 40 and 41, respectively carrying positive and negative polarity symbols as shown. The timing at which the potential is initially applied to the timing circuit is controlled by a switching means represented by a switch 42. The output signal of the circuitry appears at an output terminal 43 which is connected in common with the base terminal 12 of the unijunction transistor 10. Depending on whether a positive or negative signal is desired, a load device (not shown in the drawing) may be connected across the output terminal 43 and one of the terminals 40 or 41.

The theoretical operation of the above-described timer is believed to be as hereinafter set forth. First, as shown in the drawing, the stabilizer circuit is shown as incorporated in combination with a general timing circuit. In the general timing circuit the input of the voltage sensing circuit (emitter 13) is connected directly to the charge circuit (junction terminal 22), with the stabilizer network as taught by this invention omitted. Disregarding the stabilizer circuit and assuming that the emitter 13 is connected to the junction 22, the general timing circuit is set into operation by closure of switch 42. The capacitor 21 commences to charge and when the charged potential equals or surpasses a magnitude whereby the input to the unijunction reaches the breakover point, transistor 10 goes into negative-resistance conduction and the capacitor 21 discharges through the resistor 15 thereby providing a signal at the output terminal 43. The signal at the terminal 43 will be either negative or positive depending on whether it is taken in relation to the terminal 40 or 41. The time required for the input of the unijunction to reach the breakover potential is proportional to the product of the capacitance value of the capacitor 21 and the effective resistance of the charge circuit.

Normally the unijunction transistor 10 carries an operating bias current which flows from the positive potential source terminal 40, through the resistor 14 and the base-two terminal 11, through the silicon bar of the unijunction 10, out the base-one terminal 12 and through the resistor 15 to the negative potential source terminal 41. The magnitude of the bias current establishes the magnitude of the breakover voltage of the unijunction 10. Also in the absence of the stabilizer, the capacitor 21 is charged through the resistor 20. However, during the time the capacitor 21 is being charged, the capacitor loses charge through its own leakage (appreciable in an electrolytic) and through the emitter 13-to-base-one 12 terminals of the unijunction transistor 10. As the breakover voltage is approached, the leakage current demands of the unijunction increases considerably, and may increase to a point where the current coming into the capacitor 21 through the resistor 20 is equalled by the loss of current through the unijunction 10. If this equilibrium condition occurs anywhere before the voltage across the capacitor reaches the breakover voltage, breakover never occurs and the timer does not time out.

In order to overcome this, in the absence of the stabilizer, the value of the resistor need be decreased which means a shorter time delay or in order to obtain the same time constant requires a larger capacitor, which may require the use of an electrolytic capacitor. As well-known to those skilled in the art, though electrolytic capacitors possess high capacitance values, they have many inherent limitations. For instance, as compared to paper and other non-electrolytic capacitors, electrolytic capacitors have a shorter life and a considerable amount of leakage current. They also have a high temperature coefficient such that the leakage and the capacitance values fluctuate a great deal with changes in temperature. Consequently, timers utilizing electrolytic capacitors are limited to applications where a high degree of accuracy and reliability over a long period of time is not necessary.

Thus with the inherent limitations of the general timing circuit, it is necessary to limit use to short time delays or cope with the limitations of electrolytic capacitors. However, many applications of timer circuits require stable, reliable, versatile, compact and durable devices which may be used for long time delays, e.g., two minutes. As previously mentioned the time delay is dependent on the product of the resistance and capacitance value of the charge circuit and in order to obtain maximum stability, reliability, compactness and durability for long time delays it is necessary to use non-electrolytic capacitors. Also, it is necessary that the resistance component 20 have maximum control over the effective resistance determining the time delay.

The stabilizer circuit in series with the senser and resistance-capacitance charge circuit permits the use of resistor values much higher than could otherwise be used and also small non-electrolytic capacitors. The theoretical explanation of this is believed to be as follows. First, during the time the capacitor 21 is charging and before the unijunction 10 has reached the "breakover point," the transistor 33 supplies a high forward impedance between the terminal 22 and the emitter terminal 13 of the unijunction transistor. Accordingly, during the time the capacitor 21 is charging, there is little current leakage through the unijunction transistor 10. At the same time the transistor 33 supplies the unijunction with some leakage current. The transistor 33 supplies this leakage directly from the positive potential source connected to the terminal 40. Also, as the emitter-to-base-one voltage of the unijunction approaches the breakover value, the characteristics of unijunction transistors are such that the unijunction demands increased leakage current. The transistor is able to meet the demand because once the emitter leakage current begins increasing the base 36-to-emitter 35 current of the transistor 33 increases, which in turn permits several times (roughly 10 to 100 times depending on the transistor) this current to flow into the collector terminal 34 and out the emitter terminal 35 of the transistor 33. This multiplied current, collector 34-to-emitter 35 current, then supplies the increased unijunction emitter leakage current demand. This, in turn minimizes loading the capacitor 21 and the capacitor continues to charge until the unijunction breakover voltage is reached and the unijunction goes into negative resistance conduction at which point the capacitor provides a pulse of energy.

A limitation that may be encountered with the stabilizer circuit is that incorporation of the transistor 33 may provide a path for leakage current through the resistor 37, the collector 34 and base 36 of the transistor 33 and back to the terminal 22. This path is in parallel with the resistor 20 which may tend to decrease the net effect of the resistor 20. However, to overcome this the diode 30 is placed in series with the base terminal 36 of the transistor 33 and the junction terminal 22. In turn, the diode 32 tends to block signals attempting to pass to the terminal 22 through the reverse path of the resistor 37, the collector 34 and the base 36 of the transistor 33. Accordingly, with the diode 32 the resistance through the reverse path is of very high value and the effective resistance determining the time delay is dependent upon the preset value of resistor 20. Thus, for applications requiring long time delays (of the order of minutes), the variable resistor 20 can be increased to large values while the capacitor may be of the small paper or other non-electrolytic type.

While there has been described what is at present considered to be a preferred embodiment of the invention, it will be obvious to those skilled in the art that variations, changes and modifications may be made therein without departing from the invention. For example, various arrangements may be made of the resistance-capacitance charge circuit. Also voltage sensing circuits other than those incorporating unijunction transistors may be incorporated. Therefore, the true spirit and scope of this invention is best described by the appended claims rather than by the single embodiment herein included for illustrative purposes.

We claim:

1. A timing circuit comprising the combination of
a direct current power source;
an electrical energy storage circuit having a resistive component and a capacitive component, said storage circuit being responsive to said power source;
a voltage sensing circuit including a unijunction transistor having an emitter, a first base electrode and a second base electrode with the first and second base electrodes extending across said power source; and
a stabilizer circuit including a unidirectional diode and a transistor, the diode having an anode and a cathode with the anode connected to said storage circuit, and the transistor having a base electrode and and an emitter-collector circuit with the base electrode connected to the cathode of the diode and the emitter-collector circuit extended from said power source to the emitter of the unijunction transistor.

2. A timing circuit comprising the combination of
a direct current power source;
a resistor;
a capacitor;

means connecting said resistor and capacitor in series across said power source;
a unijunction transistor having an emitter and a first and second base electrode;
means connecting the first and second base electrodes of said unijunction transistor across said source;
a transistor having a base electrode, and an emitter-collector circuit that extends from one terminal of said power source to the emitter electrode of said unijunction transistor; and
a diode having a cathode and an anode with the cathode of said diode connected to the base of said transistor and the anode of said diode connected to the junction of said resistor and said capacitor.

References Cited by the Examiner

UNITED STATES PATENTS

| | | | |
|---|---|---|---|
| 3,131,318 | 4/1964 | Snyder et al. | 307—88.5 |
| 3,170,124 | 2/1965 | Candilis | 307—88.5 |

ARTHUR GAUSS, *Primary Examiner.*

DAVID J. GALVIN, *Examiner.*

S. D. MILLER, *Assistant Examiner.*